United States Patent [19]

Kilguss

[11] Patent Number: 4,494,279
[45] Date of Patent: Jan. 22, 1985

[54] JEWELRY CHAIN CLASP ASSEMBLY

[75] Inventor: Howard M. Kilguss, Rehoboth, Mass.

[73] Assignee: Excell Manufacturing Company, Providence, R.I.

[21] Appl. No.: 498,459

[22] Filed: May 24, 1983

[51] Int. Cl.³ .............................................. A44C 5/00
[52] U.S. Cl. ...................................... 24/336; 24/237; 24/537
[58] Field of Search ............... 24/237, 537, 344, 369, 24/371, 372, 535, 589, 629, 662

[56] References Cited

U.S. PATENT DOCUMENTS

| 1,110,579 | 9/1914 | Seeber | 24/537 |
| 1,217,633 | 2/1917 | Putnam | 29/149.5 |
| 1,706,448 | 3/1929 | Grassmann | 24/237 |
| 2,877,540 | 3/1959 | Austen | 29/527.2 |
| 2,912,562 | 11/1959 | Donovan | 219/76.14 |
| 2,968,865 | 1/1961 | Rey | 29/156.4 R |
| 3,095,130 | 6/1963 | Schultz | 82/2.5 |
| 3,156,968 | 11/1964 | White | 219/76.14 |
| 3,299,679 | 1/1967 | Anderson | 24/369 X |
| 3,703,112 | 11/1972 | Selby | 82/2/5 |
| 3,808,956 | 5/1974 | Knapp | 29/156.4 |
| 3,947,607 | 3/1976 | Gazzard et al. | 219/76.15 |
| 4,024,607 | 5/1977 | Rosenberg | 24/616 |
| 4,221,141 | 9/1980 | Oliver | 82/2.5 |
| 4,368,999 | 1/1983 | Morel | 24/537 X |
| 4,233,490 | 11/1980 | Shalai et al. | 219/76.1 |
| 4,426,854 | 1/1984 | Geldwerth et al. | 24/237 X |

FOREIGN PATENT DOCUMENTS

| 197739 | 4/1907 | Fed. Rep. of Germany | 24/237 |
| 1,463,752 | 2/1977 | Great Britain | 219/76.14 |

Primary Examiner—William E. Lyddane
Assistant Examiner—Peter A. Aschenbrenner
Attorney, Agent, or Firm—Salter & Michaelson

[57] ABSTRACT

A clasp assembly for jewelry chain and the like includes an elongated bar member attached at one end thereof to the chain, a resiliently depressible raised tongue element integrally struck in the bar member, and a fastener element which is also attached to the chain and which includes a connecting loop portion. An aperture is provided in the bar member adjacent other the end thereof for interconnecting the bar member with the connecting loop portion of the fastener element. A bead or the like is receivable on the bar member and is positionable on the chain by passing the bead over the depressible tongue member. Once the bead is received on the chain, the inadvertent removal of the bead therefrom is prevented by the raised tongue member.

6 Claims, 4 Drawing Figures

JEWELRY CHAIN CLASP ASSEMBLY

BACKGROUND AND SUMMARY OF THE INVENTION

The instant invention relates to jewlry chain and the like, and more particularly to a novel clasp assembly for detachably interconnecting first and second ends of a jewelry chain and the like of the type usable in combination with pearls or beads.

While heretofore the concept of utilizing pearls, beads, or the like in combination with extremely fine jewelry chain so that the beads or the like are slidably received on the chain is generally known, the jewelry industry has heretofore failed to provide an effective clasp assembly for interconnecting the ends of extremely fine chain when used in this type of application. More specifically, the jewelry industry has failed to provide an effective clasp assembly which can be constructed to permit the assembly of additional beads or the like on a jewelry chain after the clasp assembly has been secured thereto, and which prevents the accidental removal of beads or the like from a jewelry chain after they have been assembled thereon. Accordingly, it is seen that there is a need for an effective clasp assembly which is usable to interconnect the ends of extremely fine jewelry chain, particularly for applications wherein the chain is used in combination with beads, pearls, or the like. In this regard, there is an even further need for a clasp assembly of the above-described type which is easily manipulatable to interconnect or disconnect the ends of an extremely fine jewelry chain, but which prevents the accidental removal of beads or the like from the chain.

The clasp assembly of the instant invention fulfills this need and generally comprises an elongated substantially flat bar member having first and second ends, and having an aperture therein adjacent to each end thereof, a resiliently depressible tongue element which is integrally struck in the bar member so that it is normally offset with respect thereto and which extends generally toward the first end of the bar member, and a fastener element having a connecting loop portion which is receivable in the bar member second end aperture to detachably interconnect the fastener element to the bar member. The first end of the bar member is connectable to the first end of a jewelry chain or the like, and the fastener element is connectable to the second end thereof, and hence, by interconnecting the bar member to the fastener element, the two ends of the chain are detachably interconnected. The bar member provides a means for gripping the assembly to facilitate this operation, and the bar member and the tongue element which is integrally struck therein cooperate to provide a means for receiving and retaining beads or the like on the chain. Specifically, because of the elongated flat construction of the bar member, it can be inserted into the apertures in beads or the like to feed them onto the chain; and because the tongue element is resiliently depressible, the beads or the like can be easily moved past the tongue element and onto the chain. However, once they have been inserted onto the chain, the tongue element restricts their accidental removal therefrom. Specifically, when the beads or the like are moved in a disengaging direction from the chain towards the second end of the bar member, they engage the tongue element and are thereby prevented from being accidentally removed from the chain although the tongue element can be manually depressed to effect the removal of the beads if desired.

Several additional features provide further advantages in the preferred embodiment of the clasp assembly of the instant invention. In particular, in the preferred embodiment an aperture is also provided in the first end of the bar member and an access slit is provided in the bar member which extends inwardly from the longitudinal periphery thereof to the first end aperture. An end link of a chain or the like is receivable in the bar member first end aperture through the access slit to interconnect the bar member to the chain or the like. Accordingly, the link which defines the end of the chain or the like can be formed in a continuous closed configuration for greater strength and it can nevertheless be interconnected to the bar member. Also in the preferred embodiment of the instant invention, the fastener element portion of the clasp assembly is integrally formed from a wire element so that it includes closed loop and connecting loop portions, the jewelry chain being connected to the closed loop portion of the fastening element. The portion of the wire element which defines the connecting loop portion is formed in a generally closed loop configuration but is resiliently movable to a slightly open configuration to receive the bar member thereon. Further, the portion of the wire element which defines the connecting loop portion has a free terminal end which extends outwardly slightly. By inserting this free terminal end of the wire element into the second end aperture of the bar member, the bar member can be advanced onto the connecting loop portion to cause it to be moved to a slightly open configuration until the bar member is fully received on the fastener element.

Devices representing the closest prior art to the instant invention of which the applicant is aware are disclosed in the U.S. patents to GRESSMANN, No. 1,706,448; HOLMES, No. 1,764,451; WELLS, No. 1,841,423 and SKOBEL, No. 4,286,360. While these references broadly teach a variety of types of clasp assemblies, they do not teach or suggest a clasp assembly of the type herein disclosed which includes a bar member having an integrally struck tongue element, whereby the clasp assembly is operable for receiving and retaining beads or the like on the chain, so that they are not accidentally removed therefrom or lost. Hence, the above references are believed to be of nothing more than general interest.

Accordingly, it is a primary object of the instant invention to provide a clasp assembly which is easily manipulatable to detachably interconnect the opposite ends of relatively fine jewelry chain and the like.

Another object of the instant invention is to provide a clasp assembly which is operable to interconnect the opposite ends of a jewelry chain and also to receive and retain beads or the like on the chain.

A still further object of the instant invention is to provide a jewelry clasp assembly which includes an elongated bar member, a tongue element which is integrally struck in the bar member, and a fastener element which is interconnectable with the bar member.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
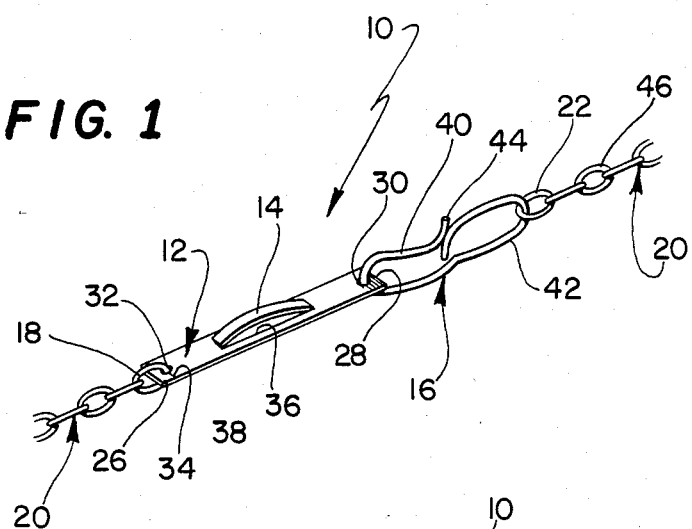
FIG. 1 is a perspective view of the clasp assembly of the instant invention as used to interconnect the ends of a jewelry chain.
Figure 2:
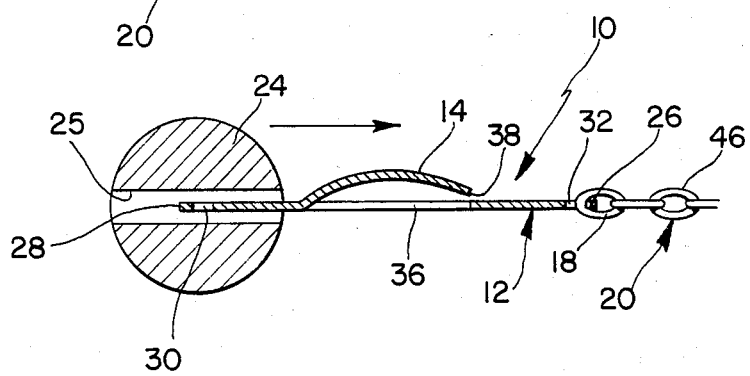
FIGS. 2 and 3 are sequential enlarged sectional views illustrating the operation of the tongue element of the clasp assembly as a bead is sequentially received and advanced on the bar member thereof.

Referring now to the drawing, the jewelry clasp assembly of the instant invention is illustrated at 10 in FIGS. The clasp assembly 10 generally comprises an elongated bar member 12, a raised tongue element 14 which is integrally struck in the bar member 12, and a fastener element 16 which is interconnectable with the bar member 12. Accordingly, a first end 18 of a jewelry chain 20 which is attached to the bar member 12 is detachably interconnectable with a second end 22 of the chain 20 which is secured to the fastener element 16. Further, due to the configuration of the tongue element 14, beads 24 can be inserted on the bar member 12 and advanced onto the chain 20, whereas the tongue element 14 prevents the accidental removal of the beads 24 from the chain 20, as will hereinafter be more fully set forth.

The bar member 12 comprises an elongated member which is preferably constructed of a suitable decorative metal such as gold and which has first and second ends 26 and 28, respectively. An aperture 30 is provided in the bar member 12 adjacent the second end 28 thereof for interconnecting the bar member 12 with the fastener element 16, and an aperture 32 is provided in the bar member 12 adjacent the first end thereof for interconnecting the bar member 12 to the first end 18 of the chain 20. In this regard, an access slit 34 extends inwardly from the longitudinal periphery of the bar member 12 to the aperture 32 to provide an access thereto which permits the first end 18 of the chain 20 to be received therein.

The tongue element 14 is integrally struck in the bar member 12 so that an elongated slot 36 is defined therein and comprises an elongated member of slightly bowed configuration which extends from the bar member 12 generally in the direction of the first end 26 thereof. The tongue element 14 terminates in a free terminal end 38 and is formed so that the central portion thereof is raised with respect to the bar member 12, as illustrated. The tongue element 14 is, however, resiliently depressible with respect to the bar member 12, whereby in the preferred embodiment it is resiliently receivable in the slot 36 for permitting the bead 24 to pass over the bar member 12 and onto the chain 20, as will hereinafter be more fully set forth.

The fastener element 16 preferably comprises connecting loop and closed loop portions 40 and 42, respectively, which are integrally formed from an elongated resilient wire element. The second end 22 of the chain 20 is interconnected with the closed loop portion 42, and the connecting loop portion 40 is preferably formed in a substantially closed loop configuration which is resiliently movable to a slightly open configuration for interconnecting the connecting loop 40 with the bar member 12. In this regard, the wire element which defines the connecting loop portion 40 terminates in an outwardly disposed terminal end 44 which is receivable in the aperture 30 so that the bar member 12 can be easily inserted on the connecting loop portion 40.

The chain 20 as herein illustrated comprises a plurality of individual interconnected links 46. The chain 20 in and of itself does not comprise part of the instant invention, and it will be understood that the use of the clasp 10 in combination with chains of other types or in combination with other types of elongated flexible members which are known in the jewelry art is contemplated.

Figure 3:
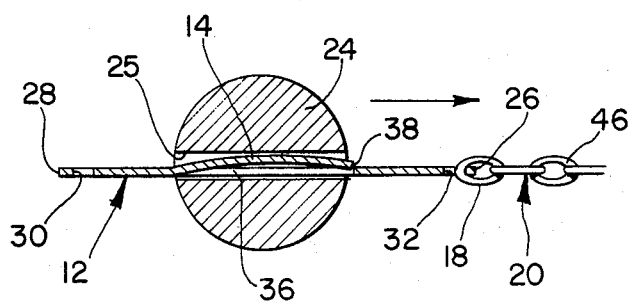
Figure 4:
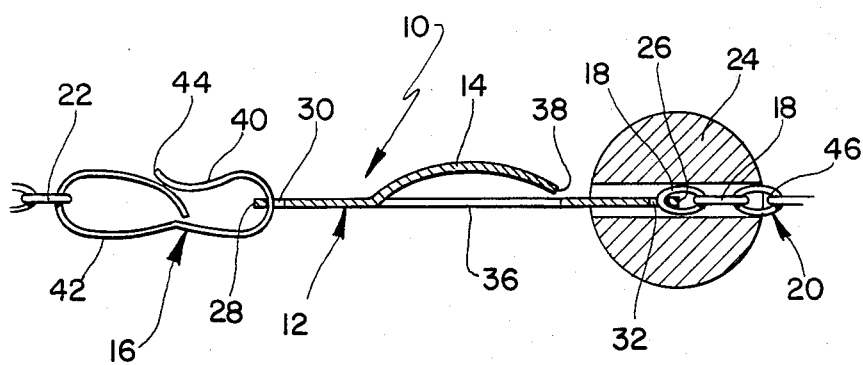
FIG. 4 is a similar view illustrating the entire clasp assembly in interconnected relation after the bead has passed over the tongue element thereof.

The clasp assembly 10 is operable to detachably interconnect the first and second ends 18 and 22, respectively, of the chain 20 in the manner illustrated in FIGS. 1 and 4. In this regard, the bar member 12 is preferably formed in an elongated configuration whereby it is easily grasped by a user to interconnect it with the fastener element 16. The fastener element 16 is easily interconnected with the bar member 12 by inserting the terminal end 44 into the aperture 30 and by thereafter advancing the bar member 12 onto the connecting loop portion 40. The tongue element 14 provides an effective means for retaining one or more beads 24 on the chain 20. In this connection, the bar member 12 is constructed with a reduced lateral dimension, whereby it is insertable in the bore 25 in a bead 24. As the bead 24 is advanced along the bar member 12, the tongue element 14 is depressed by the bead 24 so that preferably at least the terminal end 38 is received in the slot 36 whereby the bar member 12 and the tongue element 14 can pass through the bore 25 as illustrated in FIG. 3. Finally, after the bead 24 has passed over the tongue element 14, the tongue element 14 resiliently returns to its normal offset or raised disposition. As a result, if the bead 24 is thereafter inadvertently moved in a disengaging direction on the bar member 12, it will engage the tongue element 14 and be retained on the chain 20; although obviously by forcing the bead 24 past the tongue element 14 or by manually depressing the tongue element 14, the bead 24 can be removed if desired.

It is seen, therefore, that the instant invention provides an effective clasp assembly for use in combination with jewelry chain and the like, particularly jewelry chain and the like of the type which is designed for use in combination with jewelry beads. The bar member 12 is easily interconnectable with the fastener elements 16, particularly because of the configuration of the bar member 12 which permits it to be easily grasped by a user. The tongue element 14 permits beads or the like to be inserted onto a chain attached to the bar member 12, but it prevents the accidental removal of beads or the like therefrom. Accordingly, for these reasons, as well as the other reasons hereinabove set forth, it is seen that the instant invention provides a significant advancement in the jewelry art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clasp assembly for detachably interconnecting first and second ends of a jewelry chain and the like comprising:
   (a) an elongated substantially flat bar member having first and second ends, the first end of said bar member being connected to said first chain end, said bar member having an aperture therein adjacent the second end thereof;
   (b) a resiliently depressible tongue element integrally struck in said bar member, said tongue element extending generally towards said first bar member end and terminating in an upwardly disposed free terminal end, said bar member sized to permit an element having an aperture dimensioned slightly greater than the internal cross-sectional dimensions of said bar member to pass freely over said second bar member end and onto said chain without removal of said bar member first end from said chain, with said tongue element preventing inadvertent removal of the element from the chain; and
   (c) a fastener element connected to said second chain end, said fastener element having a connecting loop portion which is receivable in said bar member aperture to detachably interconnect said fastener element to said bar member.

2. In the clasp assembly of claim 1, said bar member having an aperture therein adjacent the first end thereof and an access slit which extends inwardly from the longitudinal periphery of said bar member to said first end aperture, said chain comprising a plurality of interconnected closed links, the link which defines the first end thereof being received in said bar member first end aperture through said slit to interconnect said chain to said bar member.

3. In the clasp assembly of claim 1, said fastener element further comprising a closed loop portion which is integrally formed with said open loop portion, said chain second end being connected to said fastener element closed loop portion.

4. In the clasp of claim 3, said fastener element being integrally formed from wire.

5. In the clasp assembly of claim 4, the portion of said wire element which defines said fastener element connecting loop portion being formed in a generally closed loop configuration but being resiliently movable to an open configuration for interconnecting said bar member thereto.

6. In the clasp assembly of claim 5, the portion of said wire element which defines said fastener element connecting loop portion having a free terminal end, the portion of said wire element adjacent said connecting loop free end extending generally outwardly for facilitating insertion thereof said connecting loop free end in said bar member second end aperture.

* * * * *